United States Patent
Kulkarni et al.

(10) Patent No.: US 10,163,197 B2
(45) Date of Patent: Dec. 25, 2018

(54) SYSTEM AND METHOD FOR LAYER-WISE TRAINING OF DEEP NEURAL NETWORKS

(71) Applicant: Tata Consultancy Services Limited, Mumbai (IN)

(72) Inventors: Mandar Shrikant Kulkarni, Pune (IN); Anand Sriraman, Pune (IN); Rahul Kumar, Pune (IN); Kanika Kalra, Pune (IN); Shirish Subhash Karande, Pune (IN); Purushotam Gopaldas Radadia, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 126 days.

(21) Appl. No.: 15/474,739

(22) Filed: Mar. 30, 2017

(65) Prior Publication Data

US 2018/0158181 A1 Jun. 7, 2018

(30) Foreign Application Priority Data

Dec. 2, 2016 (IN) .............................. 201621041286

(51) Int. Cl.
*G06N 3/00* (2006.01)
*G06K 9/62* (2006.01)
(Continued)

(52) U.S. Cl.
CPC .............. *G06T 5/20* (2013.01); *G06K 9/6256* (2013.01); *G06K 9/6269* (2013.01); *G06N 3/04* (2013.01);
(Continued)

(58) Field of Classification Search
CPC ...... G06N 99/005; G06N 3/08; G06K 9/6269; G06K 9/6256
See application file for complete search history.

(56) References Cited

U.S. PATENT DOCUMENTS 7,353,215 B2* 4/2008 Bartlett ................ G06K 9/6215
706/12
8,463,718 B2* 6/2013 Ben-Hur .............. G06K 9/6215
706/12
(Continued)

OTHER PUBLICATIONS

Lowe, "Similarity Metric Learning for a Variable-Kernel Classifier", Neural Computation, MITP, vol. 7, issue 1, pp. 1-15, (1993) https://pdfs.semanticscholar.org/e371/0fcec23a48582fd7f10e077d14e0679aa8d9.pdf.
(Continued)

*Primary Examiner* — Utpal D Shah
(74) *Attorney, Agent, or Firm* — Finnegan, Henderson, Farabow, Garrett & Dunner LLP

(57) ABSTRACT

System and method for layer-wise training of deep neural networks (DNNs) are disclosed. In an embodiment, multiple labelled images are received at a layer of multiple layers of a DNN. Further, the labelled images are pre-processed. The pre-processed images are then transformed based on a predetermined weight matrix to obtain feature representation of the pre-processed images at the layer, the feature representation comprise feature vectors and associated labels. Furthermore, kernel similarity between the feature vectors is determined based on a predefined kernel function. Moreover, a Gaussian kernel matrix is determined based on the kernel similarity. In addition, an error function is computed based on the predetermined weight matrix and the Gaussian kernel matrix. Also, a weight matrix associated with the layer is computed based on the error function and predetermined weight matrix, thereby training the layer of the multiple layers.

12 Claims, 3 Drawing Sheets

(51) Int. Cl.
*G06T 5/20* (2006.01)
*G06N 3/04* (2006.01)
*G06N 3/08* (2006.01)
*G06N 99/00* (2010.01)

(52) U.S. Cl.
CPC ............ *G06N 3/08* (2013.01); *G06N 99/005* (2013.01); *G06T 2207/20084* (2013.01)

(56) References Cited

U.S. PATENT DOCUMENTS

| | | | | |
|---|---|---|---|---|
| 2003/0041041 A1* | 2/2003 | Cristianini | ........... | G06K 9/6215 706/12 |
| 2004/0002928 A1* | 1/2004 | Huang | ................ | G06K 9/6273 706/20 |
| 2010/0183202 A1* | 7/2010 | Takahashi | ............ | A61B 5/7267 382/128 |
| 2018/0089537 A1* | 3/2018 | Tsunoda | ................ | G06K 9/209 |

OTHER PUBLICATIONS

Ionescu et al., "Training Deep Networks with Structured Layers by Matrix Backpropagation", Computer Vision and Pattern Recognition, arXiv:1509.07838v4 [cs.CV], pp. 1-20, (2016) Link:https://arxiv.org/pdf/1509.07838.pdf.

* cited by examiner

SYSTEM AND METHOD FOR LAYER-WISE TRAINING OF DEEP NEURAL NETWORKS

PRIORITY CLAIM

This U.S. patent application claims priority under 35 U.S.C. § 119 to: India Application No. 201621041286, filed on Dec. 2, 2016. The entire contents of the aforementioned application are incorporated herein by reference.

TECHNICAL FIELD

This disclosure relates generally to deep neural networks (DNNs), and, more particularly, to system and method for layer-wise training of the DNNs.

BACKGROUND

Deep learning has shown promising results in many machine learning applications. In computer vision, the deep learning has been successfully applied to problems, such as object detection and English character recognition. It also showed promising results for speech data where it has been applied for speech recognition and spoken keyword spotting. Generally, the effectiveness of deep neural networks lies in layered representation. The hierarchical feature representation built by the deep neural networks enable compact and precise encoding of the data. A deep learning architecture automatically learns the hierarchy of feature representations where complex features are built on the top of the simple encodings. Higher layers construct more abstract representation of the input data enabling well-generalizing representations.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides methods and systems for layer-wise training of deep neural networks (DNNs). In one aspect, a processor-implemented method includes steps of: (a) receiving, via one or more hardware processors, multiple labelled images at a layer of multiple layers of a deep neural network; (b) pre-processing, via the one or more hardware processors, the multiple labelled images; (c) transforming, via the one or more hardware processors, the pre-processed labelled images based on a predetermined weight matrix to obtain feature representation of the pre-processed labelled images at the layer, wherein the feature representation comprise feature vectors and associated labels of the pre-processed labelled images; (d) determining, via the one or more hardware processors, kernel similarity between the feature vectors based on a predefined kernel function; (e) determining, via the one or more hardware processors, a Gaussian kernel matrix based on the determined kernel similarity; (f) computing, via the one or more hardware processors, an error function based on the predetermined weight matrix and the Gaussian kernel matrix; and (g) computing, via the one or more hardware processors, a weight matrix associated with the layer based on the error function and the predetermined weight matrix, thereby training the layer of the multiple layers. Further, the method further includes receiving feature representation, obtained using the computed weight matrix, at output of the trained layer; and training another layer of the multiple layers using the received output feature representation by performing steps of (b)-(g).

In another aspect, a system for layer-wise training of a DNN is provided. The system includes one or more memories; and one or more hardware processors, the one or more memories coupled to the one or more hardware processors wherein the one or more hardware processors are capable of executing programmed instructions stored in the one or more memories to: (a) receive multiple labelled images at a layer of multiple layers of a deep neural network; (b) pre-processing the multiple labelled images; (c) transforming the pre-processed labelled images based on a predetermined weight matrix to obtain feature representation of the pre-processed labelled images at the layer, wherein the feature representation comprise feature vectors and associated labels of the pre-processed labelled images; (d) determining kernel similarity between the feature vectors based on a predefined kernel function; (e) determining a Gaussian kernel matrix based on the determined kernel similarity; (f) computing an error function based on the predetermined weight matrix and the Gaussian kernel matrix; and (g) computing a weight matrix associated with the layer based on the error function and the predetermined weight matrix, thereby training the layer of the multiple layers. Further, the one or more hardware processors are further capable of executing programmed instructions stored in the one or more memories to receive feature representation, obtained using the computed weight matrix, at output of the trained layer; and train another layer of the multiple layers using the received output feature representation by performing steps of (b)-(g).

In yet another aspect, a non-transitory computer-readable medium having embodied thereon a computer program for executing a method for layer-wise training of a DNN is provided. The method includes (a) receiving, via one or more hardware processors, multiple labelled images at a layer of multiple layers of a deep neural network; (b) pre-processing, via the one or more hardware processors, the multiple labelled images; (c) transforming, via the one or more hardware processors, the pre-processed labelled images based on a predetermined weight matrix to obtain feature representation of the pre-processed labelled images at the layer, wherein the feature representation comprise feature vectors and associated labels of the pre-processed labelled images; (d) determining, via the one or more hardware processors, kernel similarity between the feature vectors based on a predefined kernel function; (e) determining, via the one or more hardware processors, a Gaussian kernel matrix based on the determined kernel similarity; (f) computing, via the one or more hardware processors, an error function based on the predetermined weight matrix and the Gaussian kernel matrix; and (g) computing, via the one or more hardware processors, a weight matrix associated with the layer based on the error function and the predetermined weight matrix, thereby training the layer of the multiple layers. Further, the method further includes receiving feature representation, obtained using the computed weight matrix, at output of the trained layer; and training another layer of the multiple layers using the received output feature representation by performing steps of (b)-(g).

It should be appreciated by those skilled in the art that any block diagram herein represents conceptual views of illustrative systems embodying the principles of the present subject matter. Similarly, it is appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present subject matter herein provides a system and method for layer-wise training of deep neural networks (DNNs). In an embodiment, the present subject matter proposes a layer-wise training approach for deep networks (i.e., DNNs) aimed at supervised classification. In this embodiment, for each layer, transformation which enables a better representation of input data is performed. Further, a kernel matrix is defined through transformation of the layer. An optimization problem is defined to compute a desired layer transformation. The optimization attempts to render a kernel increasingly more similar to the ideal kernel matrix. In an ideal kernel matrix, data points from a same class have kernel value equal to one while data points from different classes have zero similarity. Also, a weight matrix (also referred as transformation matrix) of each layer is obtained by solving an optimization aimed at a better representation where a subsequent layer builds its representation on top of the features produced by a previous layer.

The methods and systems are not limited to the specific embodiments described herein. In addition, the method and system can be practiced independently and separately from other modules and methods described herein. Each device element/module and method can be used in combination with other elements/modules and other methods.

Figure 1:
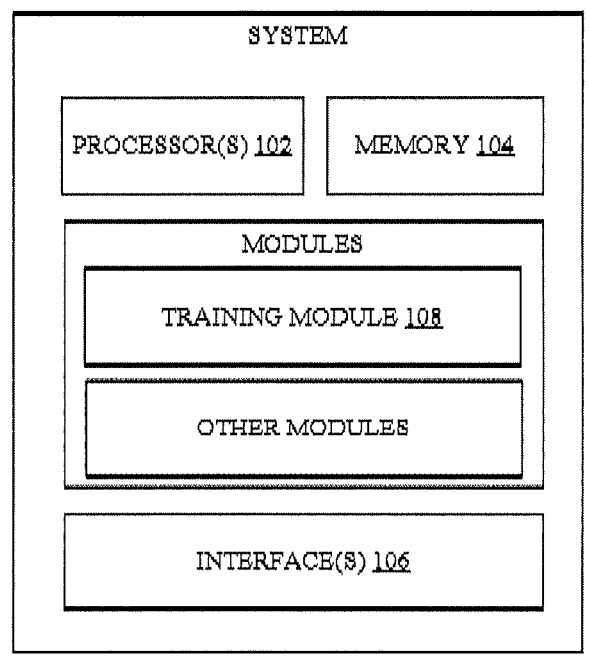
FIG. 1 illustrates a block diagram of a system for layer-wise training of deep neural network (DNNs), in accordance with an example embodiment.
Figure 2:
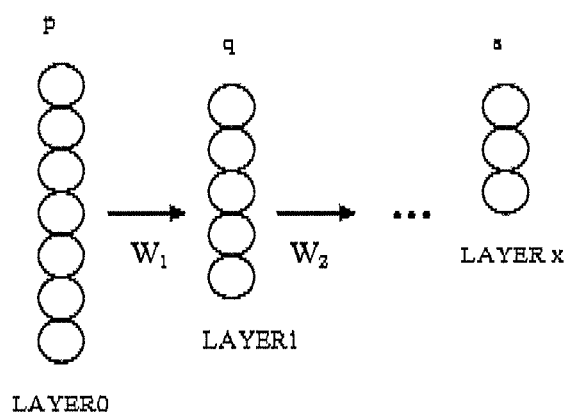
FIG. 2 illustrates a network architecture of a DNN, in accordance with an example embodiment.
Figure 3:
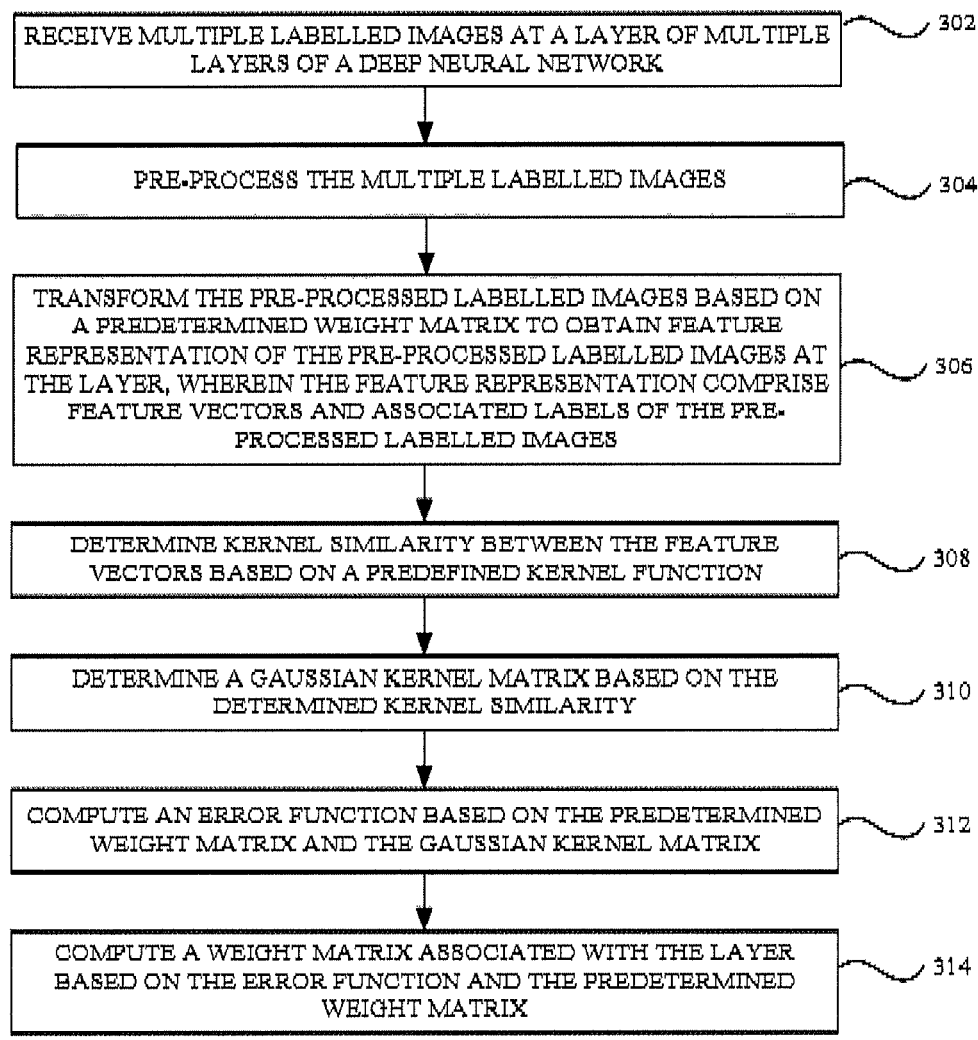
FIG. 3 illustrates a flow diagram of a method for layer-wise training of a DNN, in accordance with an example embodiment.

The manner, in which the system and method for layer-wise training of deep neural networks (DNNs), has been explained in details with respect to the FIGS. 1 through 3. While aspects of described methods and systems for layer-wise training of DNNs can be implemented in any number of different systems, utility environments, and/or configurations, the embodiments are described in the context of the following exemplary system(s).

FIG. 1 illustrates a block diagram of a system 100 for layer-wise training of DNNs, in accordance with an embodiment of the present disclosure. In an example embodiment, the system 100 may be embodied in, or is in direct communication with a computing device. The system 100 includes or is otherwise in communication with one or more hardware processors such as processor(s) 102, one or more memories such as a memory 104, and a network interface unit such as a network interface unit 106. In an embodiment, the processor 102, memory 104, and the network interface unit 106 may be coupled by a system bus such as a system bus or a similar mechanism. Although FIG. 1 shows example components of the system 100, in other implementations, the system 100 may contain fewer components, additional components, different components, or differently arranged components than depicted in FIG. 1.

The processor 102 may include circuitry implementing, among others, audio and logic functions associated with the communication. For example, the processor 102 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 102 thus may also include the functionality to encode messages and/or data or information. The processor 102 may include, among other things, a clock, an arithmetic logic unit (ALU) and logic gates configured to support operation of the processor 102. Further, the processor 102 may include functionality to execute one or more software programs, which may be stored in the memory 104 or otherwise accessible to the processor 102.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation DSP hardware, network processor, application specific integrated circuit (ASIC), FPGA, read only memory (ROM) for storing software, random access memory (RAM), and non-volatile storage. Other hardware, conventional, and/or custom, may also be included.

The interface(s) 206 may include a variety of software and hardware interfaces, for example, interfaces for peripheral device(s), such as a keyboard, a mouse, an external memory, and a printer. The interface(s) 206 can facilitate multiple communications within a wide variety of networks and protocol types, including wired networks, for example, local area network (LAN), cable, etc., and wireless networks, such as Wireless LAN (WLAN), cellular, or satellite.

The one or more memories such as a memory 104, may store any number of pieces of information, and data, used by the system to implement the functions of the system. The memory 104 may include for example, volatile memory and/or non-volatile memory. Examples of volatile memory may include, but are not limited to volatile random access memory. The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 104 may be configured to store information, data, applications, instructions or the like for enabling the system 100 to carry out various functions in accordance with various example embodiments. Additionally or alternatively, the memory 104 may be configured to store instructions which when executed by the processor 102 causes the system to behave in a manner as described in various embodiments. The memory 104 includes a training module 108 and other modules. The module 108 and other modules include routines, programs, objects, components, data structures, etc., which perform particular tasks or implement particular abstract data types. The other modules may include programs or coded instructions that supplement applications and functions of the system 100.

In operation, the training module 108 receives data (e.g., multiple labeled images) at a layer of multiple layers in a DNN. For example, the training module receives a set of n labeled images [(t$_1$, l$_1$) . . . (t$_n$, l$_n$)] at a layer of multilayer perceptron (MLP) (e.g., a network architecture 200 of the MLP is shown in FIG. 2, layers 1-x with various dimensions p, q and s is shown in architecture 200), where t denotes a vectorized training image and l denotes corresponding label. If M and N denotes dimension of an input image, then t∈R$_d^2$, d=MN×3 for a color image and d=MN for a grayscale image. For example, MNIST dataset consists of grayscale images of handwritten digits. Each image is of dimension 28×28. The dataset consist of 60 k training images and 10 k testing images. In this example, a layer dimension p is set to 784 for each layer and coefficient σ value is set to 1. In another example, CIFAR-10 dataset consists of color images of dimension 32×32 corresponding to 10 object classes. It contains 50K training samples and 10 k testing samples. In this example, the layer dimension p is set to 1500 and coefficient σ value is set to 1.

Further, the training module 108 pre-process the vectorized training images by normalizing the images independently. In an example, the vectorized training images are normalized by subtracting its mean value and dividing by its norm. Thus, avoiding saturation of neurons due to nonlinearity. Furthermore, the training module 108 projects the pre-processed labeled images onto a p dimensional space.

In addition, the training module 108 transforms the pre-processed vectorized training images based on a predetermined weight matrix. The transformation may provide feature representation of the vectorized training images. The feature representation may include feature vectors and associated labels. For example, at a kth layer, the training module 108 performs transformation as follows:

$$X_k = \tan h(D_{k-1} W_k), D_{k-1} \in R^{n \times d} \text{ and } W_k \in R^{d \times P} \quad (1)$$

where $D_{k-1}$ denotes a training data matrix and $W_k$ denotes a weight matrix for the $k^{th}$ layer. Let $X_k$ denotes feature representation of the training images at kth layer. Further, $X_k$ includes $[(x_{k1},l_1) \ldots (x_{kn},l_n)]$ that denotes individual feature vectors and corresponding labels of the training images.

In this example, vectors of the training data matrix $D_{k-1}$ are appended with one to account for the bias term. Since the first layer directly interacts with the input labelled images, $D_0$ indicates the pre-processed vectorized training images or image data. Further, for the first layer, $W_1$ (i.e., the predetermined weight matrix) is randomly initialized as with values from a normal distribution with zero mean and unit standard deviation N (0, 1).

Also, in the ideal kernel matrix, points from the same class should depict the maximum similarity while points from different classes should have least similarity. Therefore, a kernel function is predefined as follows:

T (i,j)=1, if l$_i$=l$_j$, otherwise
0.

where l$_i$ and l$_j$ denotes labels of i$^{th}$ and j$^{th}$ training points, respectively.

Also, the training module 108 determines kernel similarity of the transformed training points based on the pre-defined kernel function. For example, kernel similarity is determined for the feature set including feature vectors and associated labels. In an example embodiment, a Gaussian kernel is defined as follows:

$$K(i, j) = \exp\frac{-\|x_i - x_j\|^2}{2\sigma^2} \quad 1 \le i \le n \quad 1 \le j \le n \quad (2)$$

where $x_i$ and $x_j$ denotes feature representation for i th and jth data points at output of the first layer. Each vector is made unit norm as follows:

$$x_i = x_i/\|x_i\|_2 \quad (3)$$

The squared Euclidean norm between any two vectors can be expanded as follows:

$$\|x_i - x_j\|_2^2 = \|x_i\|_2^2 + \|x_j\|_2^2 - 2x_i^T x_j \quad (4)$$

Using Equations. 2, 3 and 4, the kernel similarity between two vectors can be obtained as follows:

$$K(i, j) = \exp\frac{-2(1 - x_i^T x_j)}{2\sigma^2}$$

Moreover, the training module 108 determines a kernel matrix based on the kernel similarity. In an example, the kernel matrix (K) is determined as follows:

$$K = \exp\frac{-(1 - X^T X)}{\sigma^2}$$

where T is the kernel function, X is the feature set and a is equal to 1.

Further, the training module 108 computes an error function (i.e., cost) based on the kernel matrix, kernel function and weight matrix of the layer (e.g., a first layer). For example, the training module 108 computes the error function as follows:

$$\text{Cost} = \frac{1}{n^2}\|K - T\|_F^2 + \lambda\|W_1\|_2^2$$

where $\|W_1\|_2^2$ denotes a second layer (L2) regularization term and $\lambda$ controls the degree of regularization.

Furthermore, the training module 108 computes gradient of the error function. In an example, the gradient of the error function is computed as follows.

$$gW = d/dW_{ij}\text{ cost}$$

In addition, the training module 108 computes a weight matrix (WM) of the first layer based on the gradient of the error function and predetermined weight matrix, thereby training the first layer of the multiple layers. In an embodiment, the training module 108 computes the weight matrix of the first layer by subtracting the gradient of the error function from the randomly initialized weight matrix (i.e., the predetermined weight matrix). The value of "µ" is 0.1. In an example, the weight matrix of the kth layer is computed as follows:

$$WM = W_k - \mu * gW$$

In this example, the training module 108 uses the computed weight matrix to output feature representation of the layer. In an embodiment, input images are transformed, using the computed weight matrix, as described in Equation 1 which provides the feature representation at a first layer. The subsequent layers are trained to compute associated weight matrices using the same procedure as described above where the feature representation provided by the first layer is considered as an input to the current layer. Data pre-processing is done prior to the calculation of each layer transformation.

Since the transformation which minimizes the error between current kernel and an ideal kernel is sought, the kernel distance between points from the same class decrease while distance between points from different classes increase. Therefore, the weight matrix computed at each layer projects data (e.g., images) onto the space which is more favorable for classification. To perform the classification, any off-the-shelf non-linear classifier can be trained on the features at the output of a layer.

FIG. 3 illustrates a flow diagram of a method 300 for layer-wise training of a DNN, in accordance with an example embodiment. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof. In an embodiment, the method 300 depicted in the flow chart may be executed by a system, for example, the system 100 of FIG. 1.

At block 302, multiple labelled images are received at a layer of multiple layers of the DNN. At block 304, the multiple labelled images are pre-processed. In an example, the pre-processing is performed by normalizing each of the multiple labelled images. The images are normalized by subtracting with associated mean and dividing by associated norm. At block 306, the pre-processed labelled images are transformed based on a predetermined weight matrix to obtain feature representation of the pre-processed labelled images at the layer. For example, the feature representation include feature vectors and associated labels of the pre-processed labelled images. At block 308, kernel similarity between the feature vectors is determined based on a predefined kernel function.

At block 310, a Gaussian kernel matrix is determined based on the determined kernel similarity. At block 312, an error function is computed based on the predetermined weight matrix and the Gaussian kernel matrix. At block 314, a weight matrix associated with the layer is computed based on the error function and the predetermined weight matrix, thereby training the layer of the multiple layers. In an embodiment, a gradient of the error function is determined. Further, the weight matrix associated with the layer is computed based on the gradient of the error function and the predetermined weight matrix.

In some embodiments, a feature representation, obtained using the computed weight matrix, is received at output of the trained layer. Further, another layer of the multiple layers is trained using the received feature representation of the layer by performing steps of blocks 304-314. Thus, training is directly on the features (i.e., data or images) learned by a layer and training does not involve updating the previously calculated features. Since number of parameters to be updated are small, the training process is more time efficient and amount of training data needed to reliably train a layer is less. The kernel analysis of the layer-wise training demonstrate that with each layer, better representation of the input data is obtained. Thus, providing its effectiveness for object recognition. Further, the present subject matter attempts to compute a linear transformation followed by non-linearity which renders kernel at each layer increasing more similar to the ideal kernel.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such non-transitory computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The foregoing description of the specific implementations and embodiments will so fully reveal the general nature of the implementations and embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A processor implemented method comprising:
   (a) receiving, via one or more hardware processors, multiple labelled images at a layer of multiple layers of a deep neural network;
   (b) pre-processing, via the one or more hardware processors, the multiple labelled images;
   (c) transforming, via the one or more hardware processors, the pre-processed labelled images based on a predetermined weight matrix to obtain feature representation of the pre-processed labelled images at the layer, wherein the feature representation comprise feature vectors and associated labels of the pre-processed labelled images;
   (d) determining, via the one or more hardware processors, kernel similarity between the feature vectors based on a predefined kernel function;
   (e) determining, via the one or more hardware processors, a Gaussian kernel matrix based on the determined kernel similarity;
   (f) computing, via the one or more hardware processors, an error function based on the predetermined weight matrix and the Gaussian kernel matrix; and
   (g) computing, via the one or more hardware processors, a weight matrix associated with the layer based on the error function and the predetermined weight matrix, thereby training the layer of the multiple layers.

2. The method as claimed in claim 1, further comprising: receiving feature representation, obtained using the computed weight matrix, at output of the trained layer; and training another layer of the multiple layers using the received feature representation of the layer by performing steps of (b)-(g).

3. The method as claimed in claim 1, wherein pre-processing the multiple labelled images comprises: normalizing each of the multiple labelled images by subtracting with associated mean and dividing by associated norm.

4. The method as claimed in claim 1, wherein computing the weight matrix associated with the layer based on the error function and the predetermined weight matrix comprises:
   determining a gradient of the error function; and
   computing the weight matrix associated with the layer based on the gradient of the error function and the predetermined weight matrix.

5. A system comprising:
   one or more memories; and
   one or more hardware processors, the one or more memories coupled to the one or more hardware processors, wherein the one or more hardware processors are capable of executing programmed instructions stored in the one or more memories to:
   (a) receive multiple labelled images at a layer of multiple layers of a deep neural network;
   (b) pre-process the multiple labelled images;
   (c) transform the pre-processed labelled images based on a predetermined weight matrix to obtain feature representation of the pre-processed labelled images at the layer, wherein the feature representation comprise feature vectors and associated labels of the pre-processed labelled images;
   (d) determine kernel similarity between the feature vectors based on a predefined kernel function;
   (e) determine a Gaussian kernel matrix based on the determined kernel similarity;
   (f) compute an error function based on the predetermined weight matrix and the Gaussian kernel matrix; and
   (g) compute a weight matrix associated with the layer based on the error function and the predetermined weight matrix, thereby training the layer of the multiple layers.

6. The system as claimed in claim 5, wherein the one or more hardware processors are further capable of executing programmed instructions to:
   receive feature representation, obtained using the computed weight matrix, at output of the trained layer; and
   train another layer of the multiple layers using the received feature representation of the layer by performing steps of (b)-(g).

7. The system as claimed in claim 5, wherein to pre-process the multiple labelled images, the one or more hardware processors are capable of executing programmed instructions to:
   normalize each of the multiple labelled images by subtracting with associated mean and dividing by associated norm.

8. The system as claimed in claim 5, wherein to compute the weight matrix, the one or more hardware processors are capable of executing programmed instructions to:
   determine a gradient of the error function; and
   compute the weight matrix associated with the layer based on the gradient of the error function and the predetermined weight matrix.

9. One or more non-transitory machine readable information storage mediums comprising one or more instructions which when executed by one or more hardware processors causes:
- receiving, via one or more hardware processors, multiple labelled images at a layer of multiple layers of a deep neural network;
- pre-processing, via the one or more hardware processors, the multiple labelled images;
- transforming, via the one or more hardware processors, the pre-processed labelled images based on a predetermined weight matrix to obtain feature representation of the pre-processed labelled images at the layer, wherein the feature representation comprise feature vectors and associated labels of the pre-processed labelled images;
- determining, via the one or more hardware processors, kernel similarity between the feature vectors based on a predefined kernel function;
- determining, via the one or more hardware processors, a Gaussian kernel matrix based on the determined kernel similarity;
- computing, via the one or more hardware processors, an error function based on the predetermined weight matrix and the Gaussian kernel matrix; and
- computing, via the one or more hardware processors, a weight matrix associated with the layer based on the error function and the predetermined weight matrix, thereby training the layer of the multiple layers.

10. The one or more non-transitory machine readable information storage mediums of claim 9, wherein pre-processing the multiple labelled images comprises:
- normalizing each of the multiple labelled images by subtracting with associated mean and dividing by associated norm.

11. The one or more non-transitory machine readable information storage mediums of claim 9, wherein computing the weight matrix associated with the layer based on the error function and the predetermined weight matrix comprises:
- determining a gradient of the error function; and
- computing the weight matrix associated with the layer based on the gradient of the error function and the predetermined weight matrix.

12. The one or more non-transitory machine readable information storage mediums of claim 9, further comprising:
- receiving feature representation, obtained using the computed weight matrix, at output of the trained layer; and
- training another layer of the multiple layers using the received feature representation of the layer by performing steps of (b)-(g).

* * * * *